United States Patent [19]
White et al.

[11] Patent Number: 5,666,902
[45] Date of Patent: Sep. 16, 1997

[54] MOULDED BOAT HULL WITH INTEGRALLY CONTAINED REINFORCED INSERTS

[75] Inventors: Mark S. White, Durham; Dennis Kovach, Cary, both of N.C.

[73] Assignee: Allied Logic Corporation

[21] Appl. No.: 595,292

[22] Filed: Feb. 1, 1996

[51] Int. Cl.$^6$ .................................................. B63B 5/24
[52] U.S. Cl. ................................. 114/357; 114/343
[58] Field of Search ......................... 114/357, 267, 114/61, 65 A, 343, 347, 266, 39.1; 441/65, 79; 411/427

[56] References Cited

U.S. PATENT DOCUMENTS

| | | | |
|---|---|---|---|
| 1,018,488 | 2/1912 | Gorsuch | 114/65 A |
| 2,632,355 | 3/1953 | Becker | 411/427 |
| 2,772,560 | 12/1956 | Neptune | 411/427 |
| 3,073,271 | 1/1963 | Brill | 114/266 |
| 3,796,175 | 3/1974 | Ford, Jr. | 114/39.1 |
| 3,840,926 | 10/1974 | Stoeberl | 114/357 |
| 4,041,716 | 8/1977 | Thompson | 114/266 |
| 4,365,577 | 12/1982 | Heinrich | 114/267 |

*Primary Examiner*—Sherman Basinger
*Attorney, Agent, or Firm*—Abelman, Frayne & Schwab

[57] ABSTRACT

An integrally moulded plastic boat hull structure is provided with a plurality of threaded inserts for securing associated boat components. Each of the threaded inserts is moulded into the boat hull structure through an intermediate insert which reinforces the hull and directs the localized forces away from the threaded insert to an enlarged boat hull region proximate the threaded insert. Where the boat hull is formed of low density polyethylene, the intermediate reinforcement member will be formed of a higher density polyethylene, to provide both a structural and molecular bond in the moulded hull. By reinforcing the location of the threaded insert and spreading its lead over a greater region, a highly localized stress point is avoided.

9 Claims, 2 Drawing Sheets

MOULDED BOAT HULL WITH INTEGRALLY CONTAINED REINFORCED INSERTS

FIELD OF THE INVENTION

This invention relates to a reinforced integrally molded plastic boat hull structure of the type shown in U.S. Pat. No. 5,458,844, which is formed of peripherally joined low density polyethylene inner and outer shells. Preferably a plurality of longitudinally extending stiffening members connect the interior region of the inner and outer shells. In accordance with the present invention, regions of localized high density polyethylene reinforcement members are integrally molded into the hull to strengthen the hull at high load points and distribute the load. This significantly reduces the concentration of forces, which might otherwise lead to early hull damage. More specifically, the present application is directed to the addition of such reinforcement members at the locations of the bow having threaded inserts for attachment to the cleats or other members, which would tend to create regions of high localized forces.

DESCRIPTION OF THE PRIOR ART

The materials of construction for a boat hull require the combination of formability, strength, attractive appearance, low maintenance and durability in the marine environment. For a very substantial period of time boat hulls of varying sizes have been constructed of wood. However, such boat hulls disadvantageously require substantial maintenance and are subject to deterioration. In addition wooden hulls require substantial labor costs for construction and use of increasingly costly wood materials.

More recently boat hulls have been increasingly constructed of fiberglass. Fiberglass materials can be formed into the shape of boat hulls and the resulting boat hull structure is sufficiently strong for boat hulls and advantageously has greater resistance to deterioration in the marine environment as compared to wooden boats. Hence, fiberglass boat hulls have become an increasingly popular material for boat construction.

There are, however, a number of problems with fiberglass as a material for boat construction. These problems include:

Manufacturing with fiberglass materials can be environmentally problematic. The release of volatile organic compounds that are distressing in both the manufacturing facilities and the immediate environs. The volatile organic compounds used in fiberglass manufacture are hazardous materials and can also be destructive to ozone in the atmosphere.

Both manufacturing waste and non-serviceable fiberglass products cannot be recycled and do not readily deteriorate in landfills. Management of fiberglass wastes is faced with increasing costs and limitation.

Fiberglass boat hulls, particularly in larger boat sizes, require internal reenforcement between the outer hull and the mechanically affixed deck. Such supports are generally provided by spaced vertical members, or "stringers", which are mechanically connected at their opposed edges to the internal surfaces of the hull and deck. As the boat hull is subjected to the stresses of its movement through water and wave, both tension and compression forces act on the outer hull and thus act conversely on the opposed edge of the stringers where they interface with the underside of the deck. This results in significant sheer forces within the stringer and at the interfaces of the stringers with the outer hull or deck. This can cause the rupture of the interconnection of the stringer to the associated hull and deck, resulting in serious damage to the boat hull structure, making it non-serviceable.

It has been suggested that the boat hull be moulded as a hollow plastic shell with an integral foam plastic reinforcement between the inner surfaces of the shell. The use of foam plastic material to provide increased strength between the inner surfaces of a shell is primarily of practical use for smaller size hulls because as the boat size increases the distance between the two shells to be filled with foam also increases. When such a boat hull is impacted, the compressional and tension sheer forces will be experienced in the foam which, similar to the stringers in the fiberglass boat, results in deleterious rupture within the foam and the loss of its required strengthening effect.

Although boats of plastic resins such as polyethylene have many desirable characteristics, prior to U.S. Pat. No. 5,458,844 it has not been feasible to commercially produce water craft of plastic material in all the most popular recreational types and sizes. Such boats include an integrally molded shell with a series of spaced longitudinal stiffening members extending between the bow and stem. Hence, by overcoming the prior structural limitations to produce boats of substantial size from plastic, the method and structure disclosed in aforementioned U.S. Pat. No. 5,458,844 has provided dramatic end benefits to consumers including: Such boats are significantly more efficient and maintenance free since the surface characteristics of the plastic are such that sea life will not grow thereon, thereby maintaining a slippery hull. As a consequence, the craft is not only significantly more fuel efficient over the course of use, as well, there is no need for expensive anti-fouling paints finishes. Indeed, since the color is integral throughout the thickness of the plastic, there is no need for a covering paint, thereby avoiding deleterious blistering or cracking. Further, scratches and other abrasions can be buffed away or are less visually disconcerting.

SUMMARY OF THE INVENTION

Such boat hulls include several locations of high localized forces where connections are made to the hull. They typically exist at the cleat connections. Areas surrounding the connection of these members to the moulded boat hull will tend to be subjected to such high localized forces. In accordance with the present invention, such regions of highly localized forces are strengthened, while the forces are distributed over an increased area. Hence, by dissipating such forces into regions of the boat hull displaced from their immediate origination an improved product results, which is less prone to stress deterioration.

In accordance with the present invention, a high density plastic member is interposed between the threaded insert molded into the shell for connection to the cleats and the surrounding shell region. Further, the overall thickness of the bow shell is thickened at the location of such inserts. In forming the boat hull, the threaded insert in the form of a T-nut is first assembled to the reinforcing member through a central opening. This assembly is then attached to one of the moulds at the desired cleat location. Typically two such assembles will be at each cleat location, in alignment with the securement openings of the cleat. The low density plastic material forming the boat hull is then introduced into the mould, and as the hull is rotationally moulded in the manner discussed in aforementioned U.S. Pat. No. 5,458,844, (whose disclosure is incorporated herein by reference), the threaded insert/planar reinforcing member assembly will be retained in place and integrally moulded into the hull. The access to each of the threaded inserts will be at their hull location where it is desired to connect the cleat or other boat member. The high density the plastic reinforcement member will be secureably moulded to the boat hull. To facilitate such integral moulded securement, the plastics of the reinforcement member and boat hull are selected to be highly compatible, to thereby create both a mechanical and molecular bond.

Accordingly, it is a primary object of the present invention to significantly reduce the localized forces present at individual regions of a moulded boat hull structure which are connected to associated components, and therefor tend to have high stress points.

A further object of the present invention is to provide a moulded boat shell structure in which threaded inserts are integrally moulded into the boat hull, with the threaded insert extending through a high density plastic member, which is integrally moulded into the boat hull at such regions of increase localized forces.

Another object of the present invention is to provide for such reinforcement of the threaded inserts, in which the shell is moulded of low density polyethylene and the force distribution member is formed of high density polyethylene.

Yet another object of the present invention is to provide a plurality of anchoring points along a moulded plastic boat hull structure, each of which comprises a threaded insert, surrounded by a higher density planar member moulded into, and between the surfaces of, the boat hull.

These as well as other of the present invention will become apparent upon consideration of the following description and drawings.

DETAILED DESCRIPTION

Figure 1:
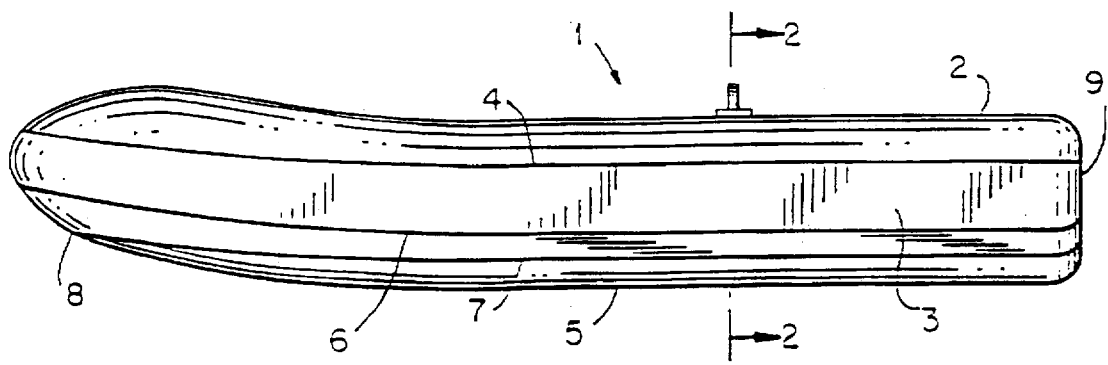
FIG. 1 is a side view of an integrally moulded plastic boat hull structure, showing the location of a typical region adapted for the reception of the reinforcement structure of the present invention.

With respect to FIG. 1 of the drawings there is provided an integrally moulded plastic boat hull generally indicated by arrow 1. As is the subject of aforementioned U.S. Pat. No. 5,458,844, the hull 1 is formed from a moldable plastic material and comprises an inner, or deck, shell 2 and an outer, or hull, shell 3. The inner shell 2 is joined to the outer shell 3 along a joint line 4. The outer shell 3 comprises a keel 5 and outboard planing strake or chine 6 and planing strake 7 disposed between the keel 5 and joint line 4 and extending longitudinally from the region of the bow 8 to the transom region at the stern 9 of the hull 1.

Figure 2:
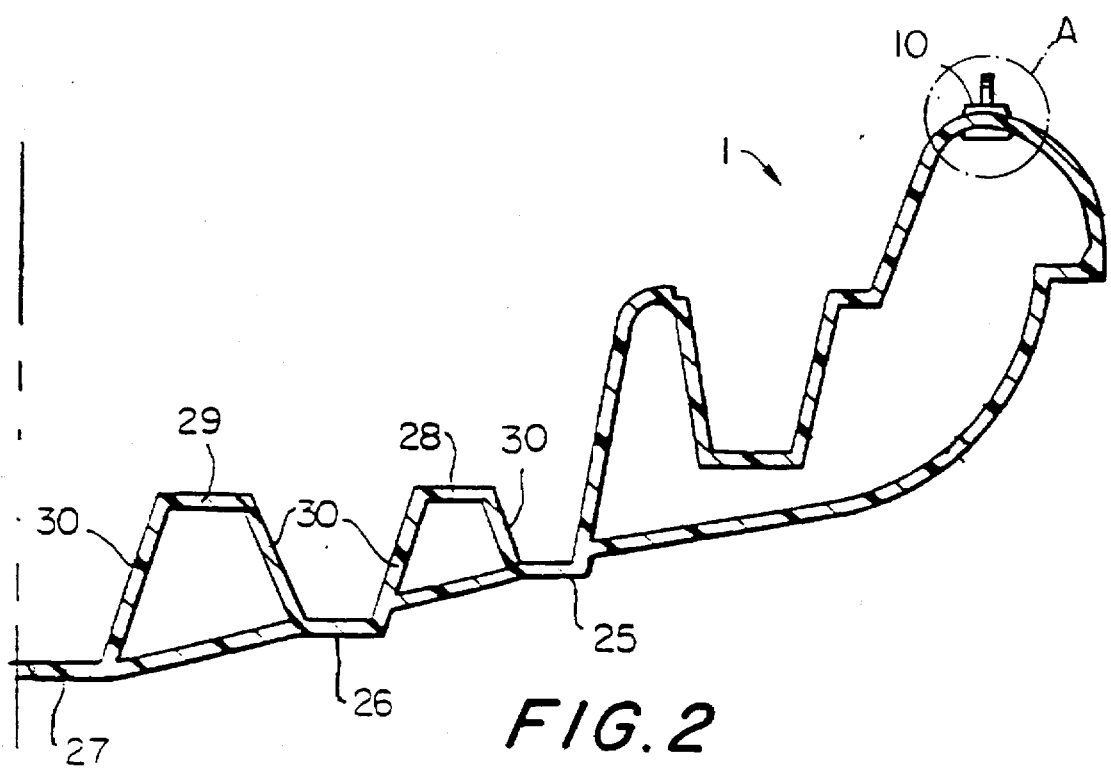
FIG. 2 is a cross sectional view corresponding to a half section at an intermediate section of the moulded boat hull, as shown by arrows 2—2.

The hull 1 is preferably formed by means of a rotary shell mould with complementary inner and outer shell moulds (as shown in U.S. Pat. No. 5,458,844) forming the boat hull unit as shown in FIG. 2, which is peripherally joined at 11. Longitudinal stiffening members are advantageously provided which have thickened lower faces 25, 26 and 27, upper flanges 28, 29 and intermediate webs 30. The stiffening member provide a series of longitudinally extending internal supports.

During moulding of the hull, the complementary inner and outer shell moulds are separated by a predetermined amount and a polymer moulding powder poured in the space between mechanism (not shown). The moulding powder may typically be a low density polyethylene, such as Dupont 8405 polyethylene, although other polymer moulding powders may be used. The assembled mould filled with the moulding powder is then heated by a suitable means, such as by a gas fired oven, into which the assembled mould may be placed, to a predetermined temperature, and is rotated and tilted according to a predetermined program cycle, and the complementary moulds moved towards each other. This ensures that the powder contained within the assembled mould flows over the entire opposed surfaces of the inner and outer shell moulds and melts to form a skin of a predetermined thickness. During this process the mould plastic is still in a soft state. Plastic at the opposed peripheral mould surfaces will be squeezed towards the interior of the mould so that a smooth peripheral the joint of a predetermined thickness will be formed at 11.

Also at the time of bringing the moulds together, adjacent internal surfaces of the plastic mould material come together so that the plastic mould material is squeezed together in its soft state, thereby forming a homogeneous connection as shown at chine 25, strake 26 and keel portion 27 in FIG. 2. Advantageously an increased thickness of material is provided at 25, 26, and 27. The mould assembly is then allowed to cool and harden after which the mould parts are separated, leaving the completed hull 1 accessible for removal from the mould. A transverse panel (not shown) may be structurally fixed to the flanges 28 and 29, spanning across both sides of the center line, as is the subject of Ser. No. 08/561,418 of Nov. 21, 1995.

Associated boat components will be connected to the hull at several locations, such as the cleat of FIG. 1. It is naturally understood that several other connection locations will be provided within the hull with one such location 10 being shown for illustrative purposes only. Such connections during boat utilization tend to create localized regions of increased forces. If the hull is not suitably strengthened at such regions, or such forces dissipated over an increased area, such localized regions of increased force can create stresses, which over time will tend to damage the boat hull.

In accordance with the present invention, the cleat 10, as well as other similar components which must be provided on the hull for connection to other boat components, are attached to threaded inserts which are first inserted in a high density plastic intermediate member, with that assembly then integrally moulded to the hull structure during the afore described moulding process.

Figure 3:
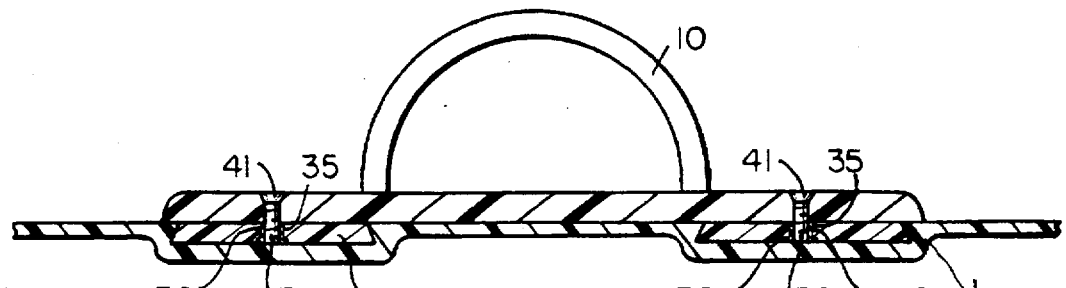
FIG. 3 is an enlargement of the region shown by the circled area A in FIG. 2.
Figure 4:
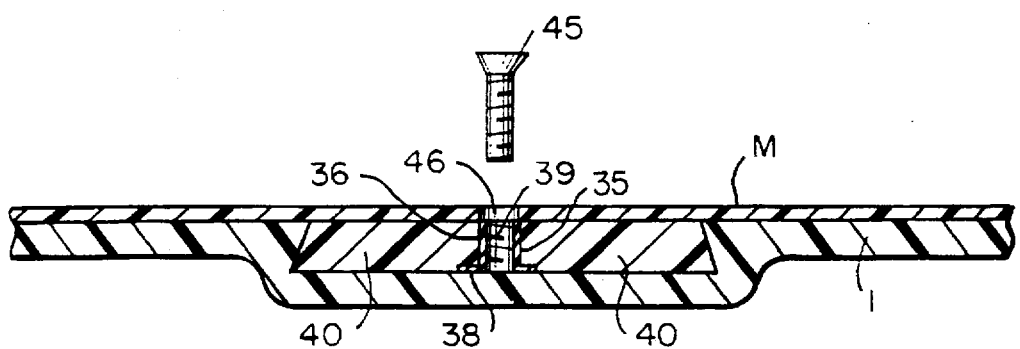
FIG. 4 shows details of the moulding step.

FIG. 4 shows a preferred embodiment of the moulding process for providing such reinforced threaded inserts within the bow 1 with the completed bow section having the moulded insert being shown in FIG. 3. Each such insert threaded includes an internally threaded T-nut 35 having a shank portion 36, head 38 and internal thread 39. The internal thread 39 is of a suitable gauge to receive the bolts 41 or for attaching cleat 10 which is to be attached to the bow 1 at the desked location. The threaded insert members 35 are first connected to a planar high density reinforcement member 40, which will be a material stronger than that forming the hull 1. One preferred material is a high density polyethylene sheet material, such as the marine grade king starboard sheet material available from King Plastic Corporation, Venice Florida. The inserts 35 are initially connected to the members 40 by bolts 45.

During the moulding process, apertures 46 will be placed within the hull mould M at those locations which are intended to receive the threaded insert 35. A bolt member 45 will then extend through the aperture 46 within the hull mould, and into the threaded insert 35 for appropriately positioning the assembly of insert 35 and reinforcing member 40 at its intended location within the finished moulded product. This will locate and retain members 35 and 40 during the moulding process. After the rotational moulding process is completed, and the boat hull has cooled and solidified, the bolt members 45 which temporarily retain the threaded insert and reinforcement member assembly 35–40 in place are removed. This results in the assembly of members 35 and 40 being integrally moulded into the plastic material of the hull 1 as shown in FIG. 3, with the hull being thickened at such locations.

The utilization of the planar member 40 serves to reinforce the location of the threaded inserts 35 and dissipate the forces transmitted from the cleat 10 to its threaded inserts 35 over a greater region of the boat hull, thereby avoiding the disadvantageous points of high localized stress.

Accordingly, the present invention provides an arrangement for integrally reinforcing locations along the moulded boat hull in a manner avoiding highly localized stress points. This is achieved by integrally moulding a threaded insert within the hull, in conjunction with a reinforcing member.

Accordingly, it should be understood that although the present invention has been described in conjunction with specific embodiments, modifications and additions may be made thereto without departing from the scope of the present invention as defined in the appended claims.

What is claimed is:

1. In an integrally moulded plastic boat hull structure formed of a first plastic material, comprising:

opposed inner and outer shells which are integrally joined around peripheral portions thereof and which are also integrally joined at adjacent regions within said periphery by interior stiffening meaning including a plurality of spaced stiffening members integrally joined to and extending between said inner shell and outer shell, to form an integral unitary hull with hollow areas between said inner and outer shells, bounded by said spaced stiffening members;

each of said shells including interior and exterior surfaces;

a plurality of fastening locations for securing associated components to at least one of said shells;

at least some of said fastening locations including a threaded insert integrally moulded into said first plastic material of at least one of said shells, and including a threaded opening at the exterior surface of said shell;

a force dissipating member formed of a second plastic material integrally moulded into, and located between the interior and exterior surfaces of said shell at said fastening location;

said second plastic material being molecularly bonded to and having a higher structural strength than said first plastic material;

said threaded insert extending through an opening in said force dissipating member and secured thereto;

such that localized forces developed at said fastening location are transferred away from the moulded attachment of said threaded insert to said shell, with said force dissipating member reinforcing said fastening location.

2. In an integrally moulded plastic boat hull structure according to claim 1, wherein:

said force dissipating member is a planar member having an area significantly greater than the cross section of said threaded insert.

3. In an integrally moulded plastic boat hull structure according to claim 2, wherein:

said force dissipating member has a rectangular area, and a central opening;

said threaded insert being a T-nut having a head portion and a shank portion secured to said force dissipating member about said central opening.

4. In an integrally moulded plastic boat hull structure according to claim 1, wherein:

said first plastic material is low density polyethylene and said second plastic material is high density polyethylene.

5. In an integrally moulded plastic boat hull structure according to claim 1, wherein:

said second plastic material of force dissipating member is high density polyethylene.

6. In an integrally moulded plastic boat hull structure according to claim 1, wherein the hull cross section is of increased thickness at the location of said planar force dissipating member.

7. In an integrally moulded plastic boat hull structure according to claim 1, including a fastening location facing a hollow area between said inner and outer shells.

8. In an integrally moulded plastic boat hull structure according to claim 1, including a fastening location within said inner shell.

9. In an integrally moulded plastic boat hull structure according to claim 8, wherein an inner shell fastening location faces a hollow area between said inner and outer shells.

* * * * *